(12) United States Patent
Coon et al.

(10) Patent No.: US 6,442,001 B1
(45) Date of Patent: Aug. 27, 2002

(54) AXIAL FORCE ATTACHMENT OF LOAD BEAMS TO ACTUATORS

(75) Inventors: Warren Coon; Wenyu Wu, both of Temecula, CA (US)

(73) Assignee: Manecomp Corporation, Temecula, CA (US)

( * ) Notice: Subject to any disclaimer, the term of this patent is extended or adjusted under 35 U.S.C. 154(b) by 0 days.

(21) Appl. No.: 09/460,038

(22) Filed: Dec. 13, 1999

Related U.S. Application Data

(60) Provisional application No. 60/138,114, filed on Jun. 7, 1999.

(51) Int. Cl.⁷ .................................................. G11B 21/16
(52) U.S. Cl. .................................. 360/266.1; 360/244.5
(58) Field of Search ........................ 360/244.6, 244.7, 360/244.5, 245.2, 266.1

(56) References Cited

U.S. PATENT DOCUMENTS

| | | | | |
|---|---|---|---|---|
| 4,829,395 A | * | 5/1989 | Coon et al. ................. | 360/104 |
| 4,947,275 A | * | 8/1990 | Hinlein ........................ | 360/104 |
| 5,153,794 A | * | 10/1992 | Hinlein ........................ | 360/104 |
| 5,172,286 A | * | 12/1992 | Jurgenson .................... | 360/104 |
| 5,185,683 A | * | 2/1993 | Oberg et al. ................. | 360/104 |
| 5,187,626 A | * | 2/1993 | Hopkins et al. ............. | 360/104 |
| 5,191,705 A | * | 3/1993 | Toensing ..................... | 29/764 |
| 5,262,911 A | * | 11/1993 | Cain et al. ................... | 360/104 |
| 5,390,058 A | * | 2/1995 | Yamaguchi .................. | 360/104 |
| 5,444,587 A | * | 8/1995 | Johnson et al. ............. | 360/104 |
| 5,579,190 A | * | 11/1996 | Mastache et al. ........... | 360/106 |
| 5,602,698 A | * | 2/1997 | Miyazaki et al. ............ | 360/104 |
| 5,646,802 A | * | 7/1997 | Akiyama et al. ............ | 360/104 |
| 5,706,574 A | * | 1/1998 | Shimanuki ................ | 29/603.03 |
| 5,870,254 A | * | 2/1999 | Baserman et al. .......... | 360/104 |
| 5,877,919 A | * | 3/1999 | Foisy et al. ................. | 360/104 |
| 5,949,615 A | * | 9/1999 | Hernandez ................... | 360/104 |
| 6,230,959 B1 | * | 5/2001 | Heist et al. ................. | 228/155 |

* cited by examiner

Primary Examiner—Brian E. Miller
(74) Attorney, Agent, or Firm—Louis J. Bachand

(57) ABSTRACT

A disk drive suspension is mounted to an actuator arm by axial and not radial forces, the forces being imparted by upper and lower flanges of a cylindrical connector extending through the actuator arm and the mount plate to which the load beam is attached.

26 Claims, 3 Drawing Sheets

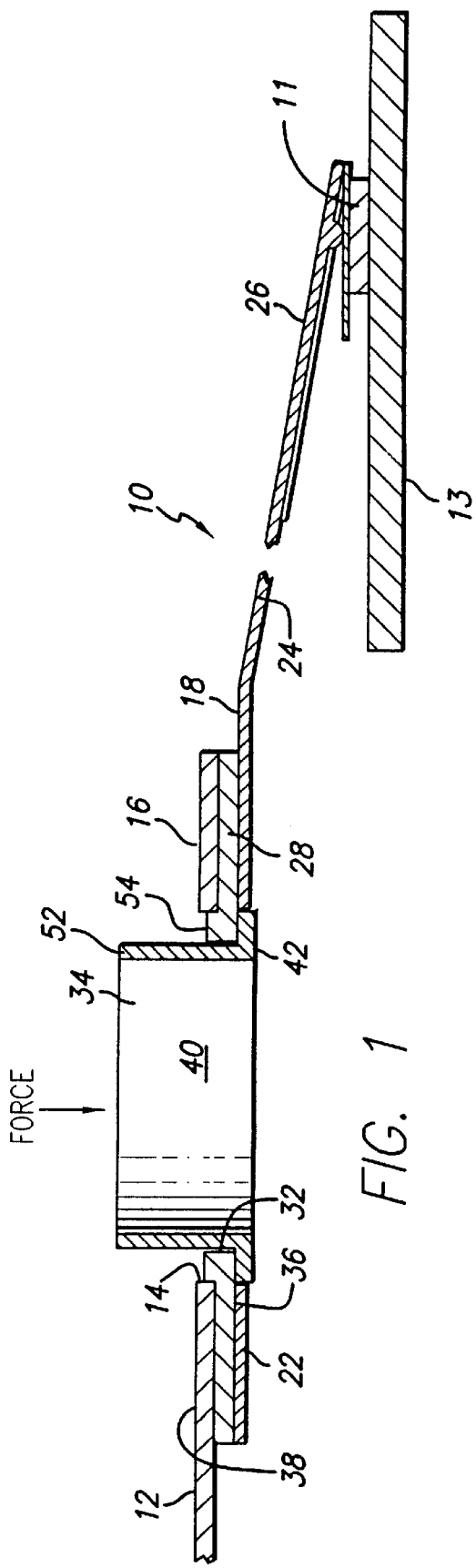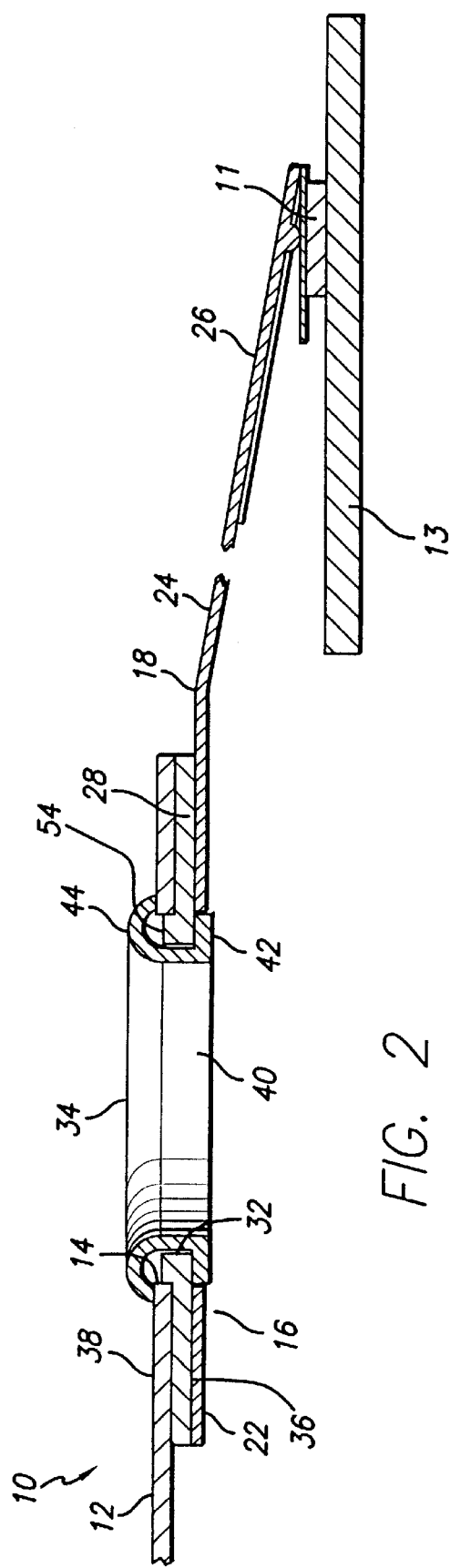

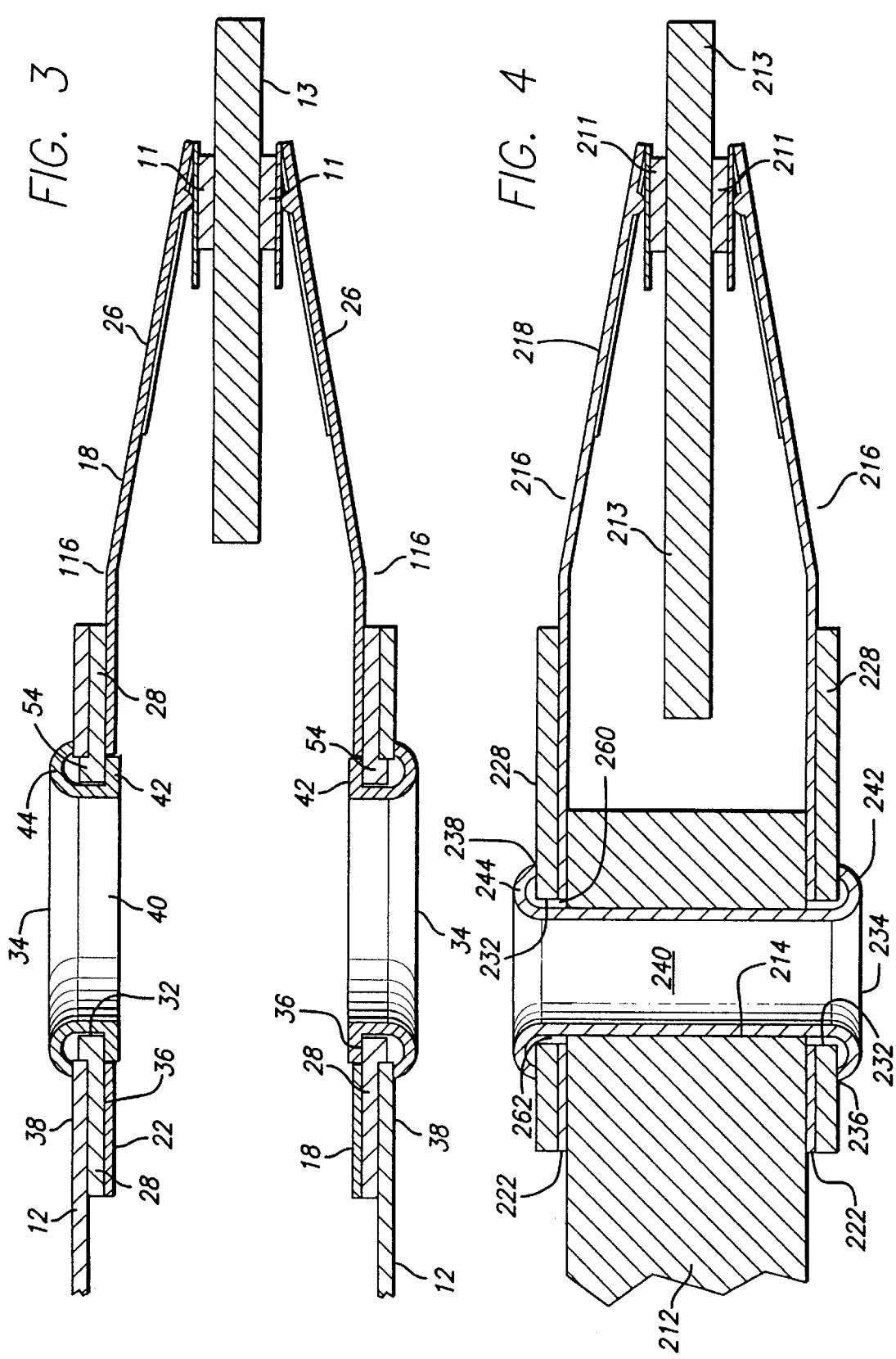

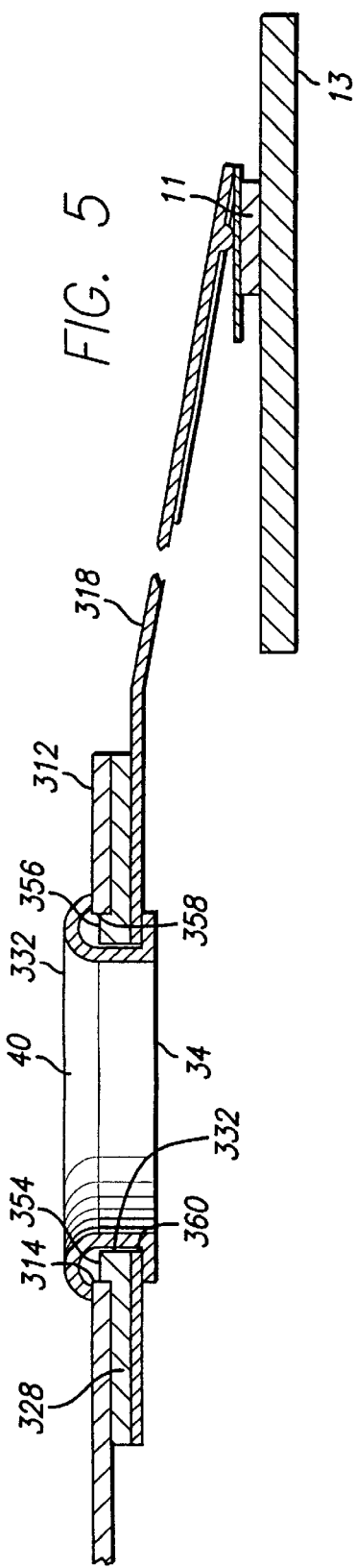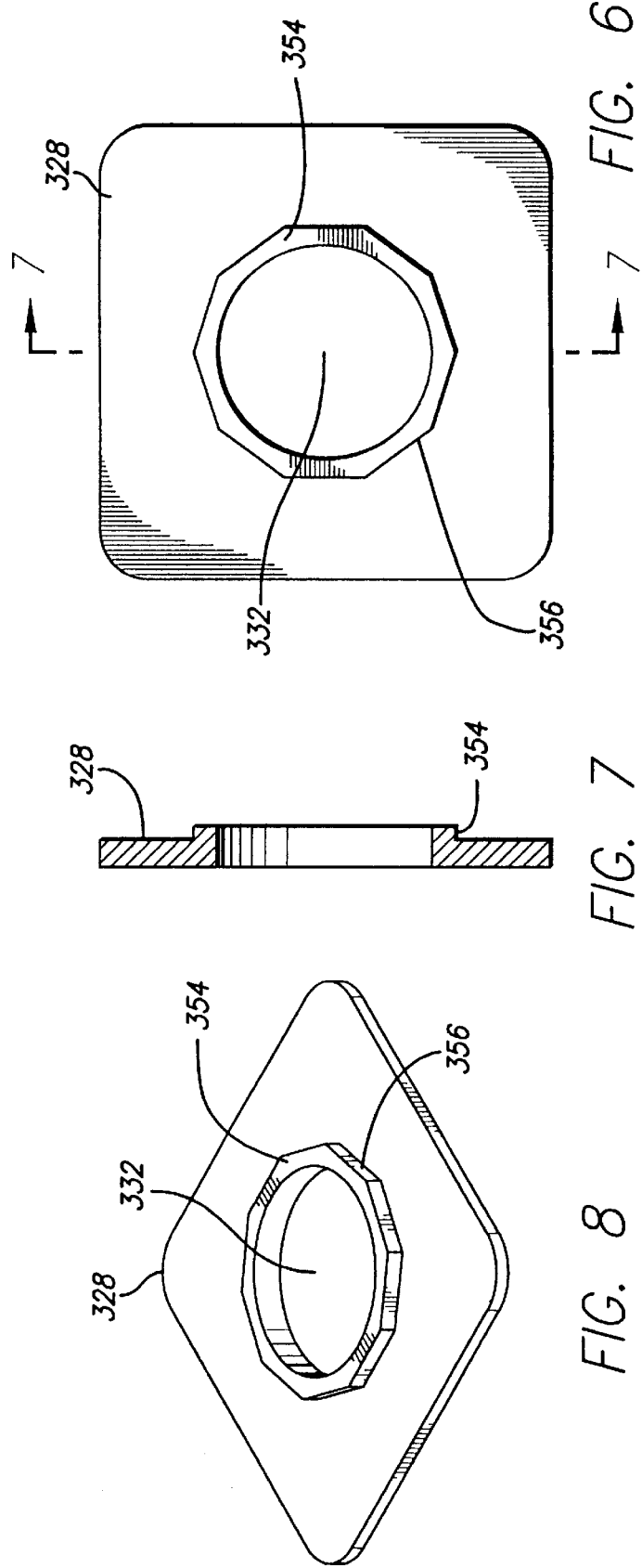

AXIAL FORCE ATTACHMENT OF LOAD BEAMS TO ACTUATORS

REFERENCE TO RELATED APPLICATION

This application claims the benefit of U.S. Provisional Application Ser. No. 66/138,114 filed Jun. 7, 1999.

BACKGROUND OF THE INVENTION

1. Field of the Invention

This invention relates to disk drive suspensions, and more particularly, to disk drive suspensions having the suspension assembly held onto the actuator arm by a planar or nearly planar mount plate and connector combination. The invention combination mount plate and connector does not rely on radial forces to engage the mount plate and arm, as is conventional, but uses axial forces imposed on the opposite sides of the arm and mount plate by flanges carried by the connector.

2. Related Art

Known suspension attachment methods generally involve the use of ball staking or swaging, e.g. as shown in U.S. Pat. No. 4,829,395. These prior art techniques are well adapted to the case where a stack of four or more head gimbal assemblies; (HGAs) is to be assembled. The prior art achieves the reliable attachment and labor efficiency associated with ball staking by incorporating a mount plate that has a boss. The boss is designed so that it can form an attachment to the actuator arm with the use of planar tooling that can be inserted into a stack. Planar tooling holds the pieces together without requiring access to the interior of the boss cylinder.

There is, however, a relentless drive to achieve ever-lower costs for disk drive suspensions. In addition, there is a trend toward the production of disk drives that have reduced number of disks. As the areal density (number of digital bits stored per unit area) increases historically at a compound annual rate of 60%, the disk drives no longer need to have four, six, or more disks per drive to get the total capacity deemed necessary. Industry leaders have announced that they can achieve 20 Gb (Gigabits) per square inch or 2.5 GB (GigaBytes) per square inch, so that a 3.5 inch single disk drive will soon be able to store 20 GB of data, assuming that there are about 8 square inches of surface available on both sides of a 3.5-inch disk.

SUMMARY OF THE INVENTION

These trends mean that the best design is one that achieves the lowest cost for a single disk arrangement, with the ability to stack multiple disks being less important than before. The mount plate is a significant cost element at about 4 cents per part or 15 to 25% of the material cost of a suspension without wireless flexure, 10 to 20% of the material cost of a suspension with wireless flexure.

Accordingly, the invention offers the following advantages:

The mount plate design is changed so that it is planar, i.e. has no annular boss, or essentially planar i.e. having a small, even vestigial, boss sized to be useful only for guiding the alignment of the mounting plate and actuator arm opening. In the invention, typically, the boss, if any, is made to be less than half the thickness of the mounting plate flange, instead of one to one and a half times greater than the flange thickness as before. The mount plate may be etched from full hard SST foil instead of stamped from quarter hard or soft SST foil. The harder mount plate material is desirable provides a stiffer platform from which to mount the load beam, but previous techniques, swaging, did not permit use of the harder material without adverse consequences to the shape of the mount plate and gram load stability. A harder mount plate is less likely to deform during attachment, or alternatively, can be made thinner for the same degree of deformation.

Preferably the invention mount plates are etched to shape. Etched construction achieves the lowest possible cost for the part. The etched construction also allows a degree of design freedom, such as a polygon shape to be used for the boss OD, which means the boss can be splined into the actuator arm hole.

The mount plate can have a boss such as a partially etched boss that is very short, approximately 0.003 inch. This boss is able to be much shorter than a stamped mounting plate boss because its primary function is to merely maintain alignment with (pilot into) the actuator tooling hole opening whereas in the prior art its function was the more difficult one of providing alignment.

In addition, in the prior art the boss necessarily had to have enough axial engagement to make the attachment of the mount plate to the actuator arm with sufficient force to successfully resist the applied torque found in use of the suspension.

In the present invention, a boss, if present at all, does not provide attachment engagement. In fact in many cases there is not even full circumferential contact between the mount plate boss and the actuator arm opening.

In place of the conventional swaged boss, the invention uses a relatively soft eyelet that has a terminal flange that is rolled or coined into axial engagement to effect attachment of the hard mount plate to the actuator arm.

The actuator arm performs the function of the washer that is usually used with an eyelet assembly. Thus, instead of making the whole suspension assembly mounting soft so it can be staked, the flange is hard and the eyelet is soft.

The cost of the mount plate drops from about 4 cents to less than two cents. The mount plate may be made with or without an etched boss for piloting. The mount plate may be obtained loose (as individual separate pieces), or on a strip with the same pitch as the load beam and flexure strips.

The eyelet is available at a less than a cent each, made of 300 series (non-magnetic) stainless steel, or brass, or other materials. Since the mounting plate flange or baseplate is not deformed in a swaging or staking operation in the course of assembling disk drive suspensions according to the invention, there is not the usual gram load change from this source.

Further, since the mounting plate baseplate is made of hard material, it is more rigid and flexes less in vibration.

The soft eyelet is crushed in suspension assembly by coining or rolling an unflanged end, the other end is generally preformed, pressing the, mount plate (carrying the load beam attached) and actuator arm tightly together, while maintaining the alignment of the mount plate and load beam. The deformation will be mostly on the eyelet because it is purposely made of softer stainless steel material than the load beam and mount plate stainless steel sheets.

The invention completely eliminates the staking process, and as well greatly improves the rigidity of the connection between mount plate and actuator. A better suspension and HGA performance is achieved.

In addition, in this invention, the load beam may on the slider side of the mount plate so that variations in gram load performance due to variations in actuator dimensions are be minimized.

This invention is ideal for one-head or two-head drives as shown in the ensuing description.

The foregoing benefits and advantages comprise the major objects of the invention and are realized in a disk drive suspension adapted to support a slider in operating proximity to a disk and for mounting to an actuator arm having a through opening, the suspension comprising a suspension assembly of a load beam having a base portion, a spring portion and a rigid portion, a mounting plate to which the load beam is attached by its the base portion, the mounting plate having a through opening registered with the actuator arm through opening, and a connector fastening the mounting plate and load beam to the actuator arm, the suspension assembly having first and second faces, the connector comprising an axially extended body of a length to extend through the mounting plate and actuator arm registered through openings and at least to the assembly first and second faces, the connector body having a first terminal flange axially engaging the first face of the suspension assembly and a second terminal flange axially engaging the second suspension assembly face in load beam to actuator mounting relation.

In this and like embodiments, typically, the plate and arm through openings have a circular perimeter and a given diameter, the connector body having a circular perimeter and a given diameter smaller than the plate and arm openings given diameter and such that the connector body circular perimeter does not radially engage the full extent of the plate and arm openings circular perimeters, the connector body first flange is preformed before assembling the load beam, mounting plate and actuator arm, the connector body second flange being formed in situ following assembly, the connector body second flange is formed by rolling the end of the connector body into a flange engaged with the assembly, the suspension assembly load beam is on the disk side of the assembly, the suspension assembly is paired with a second and like suspension assembly on the opposite side of the disk from the first suspension assembly, the mounting plate is planar, or the mounting plate is planar except for a boss defined by the mounting plate, the mounting plate boss being adapted to freely fit within the actuator through opening, the mounting plate defines a boss having a polygonal outer periphery, the actuator through opening has a polygonal inner periphery interfitting with the mounting plate boss outer periphery, the load beam defines a through opening registered with the mounting plate opening, the load beam being bonded to the mounting plate outwardly of the load beam through opening, the load beam is relieved circumferentially of the load beam through opening to have a recess sized to bodily receive one or another of the connector terminal flanges, and/or the suspension assembly load beam and mount plate are paired with a like suspension assembly load beam and mount plate, the suspension assemblies being arranged to provide sliders on opposite sides of the disk, the load beam bases and mount plates being mounted to and separated by a common actuator arm having the through opening, a single connector body extending through both the mount plate through openings and the actuator arm through opening with its the first and second flanges axially engaging first and second outer faces of the paired suspension assemblies.

In a preferred embodiment, the invention provides a disk drive suspension mounting plate comprising a flange having central tubular boss, the mounting plate boss having a polygonal outer periphery for engaging a complementary actuator arm opening.

In a further preferred embodiment, the invention provides a disk drive suspension for mounting on an actuator arm having a through opening, the suspension comprising a suspension assembly supporting a slider in operating proximity to a disk and comprising a load beam having a base portion, a spring portion and a rigid portion, a slider supported by the rigid portion, a mounting plate to which the load beam is attached by its the base portion, the mounting plate having a through opening registered with the actuator arm through opening, and a connector fastening the mounting plate and load beam to the actuator arm, the suspension assembly having first and second faces, the connector comprising an axially extended body of a length to extend through the mounting plate and actuator arm registered through openings and at least to the assembly first and second faces, the connector body having a first terminal flange axially engaging the first face of the suspension assembly and a second terminal flange axially engaging the second suspension assembly face in load beam to actuator mounting relation.

In this and like embodiments, typically, the plate and arm through openings have a circular perimeter and a given diameter, the connector body having a circular perimeter and a given diameter smaller than the plate and arm openings given diameter and such that the connector body circular perimeter does not radially engage the full extent of the plate and arm openings circular perimeters, the connector body first flange is preformed before assembling the load beam, mounting plate and actuator arm, the connector body second flange being formed in situ following assembly, the connector body second flange is formed by rolling the end of the connector body into a flange engaged with the assembly, the connector body second flange is rolled to have a radius, the load beam defines a through opening registered with the mounting plate opening, the load beam being bonded to the mounting plate outwardly of the load beam through opening, and the load beam is relieved circumferentially of the load beam through opening to have a recess sized to bodily receive one or another of the connector terminal flanges.

In a further embodiment the invention provides paired disk drive suspensions for mounting on a common actuator arm having a through opening, the suspensions each comprising a suspension assembly supporting a slider in operating proximity to opposite sides of a disk and comprising a load beam having a base portion, a spring portion and a rigid portion, a slider supported by the rigid portion, a mounting plate to which the load beam is attached by its the base portion, the mounting plate having a through opening registered with the actuator arm through opening and an outer face, and a single connector body extending through both the mount plate through openings and the actuator arm through opening, the single connector body having first and second flanges axially engaging the outer faces of the paired suspension assemblies.

In its method aspects the invention provides a method of assembling a disk drive suspension to an actuator arm having a through opening, including juxtaposing a through hole containing mount plate to which a load beam is attached with the actuator arm in through hole aligned relation, passing a connector having a first terminal flange through the aligned through holes, and forming a second terminal flange on the connector in situ in a manner forcing the mount plate and actuator arm together axially in load beam supporting relation on the actuator arm.

BRIEF DESCRIPTION OF THE DRAWINGS

The invention will be further described in conjunction with the attached drawings in which:

FIG. 1 is a vertical section view of one embodiment of the invention, the connector not having yet been rolled to form the second flange;

FIG. 2 is a view like FIG. 1 following rolling of the connector to form the second flange;

FIG. 3 is a view like FIG. 2 but of a two suspension embodiment of the invention, the suspensions being independently mounted to separate actuator arms by separate connectors;

FIG. 4 is a view like FIG. 3 but of a further two suspension embodiment of the invention in which the two suspensions are mounted with a single connector to a common actuator arm and the mounting plate boss is omitted;

FIG. 5 is a view like FIG. 2, but having the boss polygonal;

FIG. 6 is a top plan view of a mounting plate of FIG. 5 having a polygonal boss;

FIG. 7 is a sectional view of the mounting plate of FIG. 6, taken on line 7—7 in FIG. 6; and, FIG. 8 is an oblique view of the mounting plate of FIG. 6.

DETAILED DESCRIPTION

With reference now to FIGS. 1 and 2, the invention disk drive suspension is shown at 10 and is adapted to support a slider 11 in operating proximity to a disk 13 and for mounting to an actuator arm 12 having a through opening 14. The suspension 10 comprises a suspension assembly 16 of a load beam 18 having a base portion 22, a spring portion 24 and a rigid portion 26. Mounting plate 28 to which the load beam 18 is attached by its base portion 22 has a through opening 32 registered with the actuator arm 12 through opening 14, (uncoined in FIG. 1 and coined in FIG. 2). Connector 34 fastens the mounting plate 28 and load beam 18 to the actuator arm 12. The suspension assembly 16 has first and second faces 36, 38. The connector 34 comprises an axially extended connector body 40 of a length to extend through the mounting plate and actuator arm registered through openings 14, 32 and at least to the assembly first and second faces 36, 38 sufficiently to provide flanges 42, 44. The connector body 40 has a first terminal flange 42 axially engaging the first face 36 of the suspension assembly 16 (FIGS. 1 and 2) and a second terminal flange 44 axially engaging the second suspension assembly face 38 in load beam to actuator mounting relation (FIG. 2). The connector body second flange 44 is formed in situ following assembly by rolling the cylindrical end of the connector body into a flange engaged with the assembly 16 with a suitable tool not shown.

Typically, the mounting plate 28 and actuator arm 12 through openings 32, 14 have a circular, perimeter and a given diameter as shown. The connector body 40 also has a circular perimeter and a given diameter, but the diameter of body 40 is smaller than both the mounting plate and actuator arm openings 32, 14 given diameters and such that the connector body circular perimeter does not radially engage the full extent of the plate and arm openings circular perimeters. This engagement, common in conventional swage mounting techniques is unnecessary in this invention since the engaging force comes from facial not radial engagement as described above.

The connector body first flange 42 is preformed before assembling the load beam 18, mounting plate 28 and actuator arm 12. The connector body second flange 44 is formed in situ following assembly of the noted parts by rolling the end 52 of the connector body 40 into the flange so as to be engaged with the assembly mounting plate 28.

In the embodiment of FIGS. 1 and 2 the suspension assembly load beam 18 is on the disk 13 side of the assembly 16. In a further embodiment, shown. In FIG. 3. the suspension assembly 116 is paired with a second and like suspension assembly 116 on the opposite side of the disk 13 from the first suspension assembly.

In the FIG. 4 embodiment, the mounting plate 228 is planar, omitting the small boss 54 shown in the mounting plate 28 in FIGS. 1, 2 and 3.

Additionally in FIG. 4, load beam 218 is relieved circumferentially of the load beam through opening 260 to have a recess 262 sized to bodily receive one or another of the connector terminal flanges 242, 244 before coining. In FIG. 4 the suspension assembly load beam 218 and mount plate 228 are paired with a like suspension assembly load beam and mount plate, the suspension assemblies 216 being arranged to provide sliders 211 on opposite sides of the disk 213. The load beam bases 222 and mount plates 228 are mounted to and separated by a common actuator arm 212 having the through opening 214. A single connector body 240 extends through both of the mount plate through opening[s] 214 and the actuator arm through opening 232 with its first and second flanges 242, 244 axially engaging first and second outer faces 236, 238 of the paired suspension assemblies 216.

With reference to FIGS. 5–8, mounting plate 328 defines a boss 354 having a polygonal outer periphery 356. The actuator 312 through opening 314 has a polygonal inner periphery 358 interfitting with the mounting plate boss outer periphery 356. Load beam 318 defines a through opening 360 registered with the mounting plate opening 332, the load beam being bonded to the mounting plate 328 outwardly of the load beam through opening.

The foregoing objects are thus met.

We claim:

1. A disk drive suspension adapted to support a slider in operating proximity to a disk and comprising an actuator arm having a through opening, a suspension assembly of a load beam having a base portion, a spring portion and a rigid portion, a mounting plate to which said load beam is attached by its said base portion, said mounting plate having a through opening registered with said actuator arm through opening, and a connector separate from said mounting plate and load beam fastening said mounting plate and load beam to said actuator arm, said suspension having first and second faces, said connector comprising an axially extended body of a length to extend through said mounting plate and actuator arm registered through openings and at least to said suspension first and second faces, said connector body having a first terminal flange axially engaging the first face of said suspension and a second terminal flange axially engaging the second face of said suspension in load beam-to-actuator mounting relation by facial engagement between said terminal flanges and said suspension and not radial engagement between said suspension and said connector body.

2. The disk drive suspension according to claim 1, in which said plate and arm through openings have an inner circular perimeter and a given diameter, said connector body having an outer circular perimeter and a given diameter smaller than said plate and arm through openings given diameter and such that said connector body outer circular perimeter does not radially engage the full extent of said inner circular perimeters of said plate and arm through openings.

3. The disk drive suspension according to claim 1, in which said connector body first flange is preformed before assembling said load beam, mounting plate and actuator arm, said connector body second flange being formed in situ following assembly.

4. The disk drive suspension according to claim 3, in which said connector body second flange is formed by rolling the end of said connector body into a flange engaged with said suspension.

5. The disk drive suspension according to claim 1, in which said suspension, assembly load beam is on the disk side of said assembly.

6. The disk drive suspension according to claim 1, in which said suspension assembly is paired with a second and like suspension assembly on the opposite side of said disk from said first suspension assembly.

7. The disk drive suspension according to claim 1, in which said mounting plate is planar.

8. The disk drive suspension according to claim 1, in which said mounting plate is planar except for a boss defined by said mounting plate, said mounting plate boss being adapted to freely fit within said actuator through opening.

9. The disk drive suspension according to claim 1, in which said mounting plate defines a boss having a polygonal outer periphery.

10. The disk drive suspension according to claim 9, in which said actuator through opening has a polygonal inner periphery interfitting with said mounting plate boss outer periphery in contacting relation.

11. The disk drive suspension according to claim 1, in which said load beam defines a through opening registered with said mounting plate opening, said load beam being bonded to said mounting plate outwardly of said load beam through opening.

12. The disk drive suspension according to claim 11, in which said load beam is relieved circumferentially of said load beam through opening to have a recess sized to bodily receive one or another of said connector terminal flanges.

13. The disk drive suspension according to claim 1, in which said suspension assembly load beam and mount plate are paired with a like suspension assembly load beam and mount plate, said suspension assemblies being arranged to provide sliders on opposite sides of said disk, said load beam bases and mount plates being mounted to and separated by a common actuator arm having said through opening, a single connector body extending through both said mount plate through openings and said actuator arm through opening with its said first and second flanges axially engaging first and second outer faces of said paired suspension assemblies.

14. A disk drive suspension comprising an actuator arm having a through opening, a suspension assembly supporting a slider in operating proximity to a disk and comprising a load beam having a base portion, a spring portion and a rigid portion, a slider supported by said rigid portion, a mounting plate to which said load beam is attached by its said base portion, said mounting plate having a through opening registered with said actuator arm through opening, and a connector fastening said mounting plate and load beam to said actuator arm axially and not radially, said suspension having first and second faces, said connector comprising an axially extended body of a length to extend through said mounting plate and actuator arm registered through openings and at least to said suspension first and second faces, said connector body having a first terminal flange axially engaging the first face of said suspension and a second terminal flange axially engaging the second face of said suspension in load beam-to-actuator mounting relation.

15. The disk drive suspension according to claim 14, in which said plate and arm are metal structures, said plate and arm through openings having an inner circular perimeter and a given diameter, said connector body having an outer circular perimeter and a given diameter smaller than said plate and arm openings given diameter and such that said connector body outer circular perimeter does not radially engage the full extent of said inner circular perimeters of said plate and arm openings.

16. The disk drive suspension according to claim 15, in which said connector body first flange is preformed before assembling said load beam, mounting plate and actuator arm, said connector body second flange being formed in situ following assembly.

17. The disk drive suspension according to claim 16, in which said connector body second flange is formed by rolling the end of said connector body into a flange engaged with said assembly.

18. The disk drive suspension according to claim 17, in which said connector body second flange is rolled to have a radius.

19. The disk drive suspension according to claim 16, in which said suspension assembly load beam is on the disk side of said assembly.

20. The disk drive suspension according to claim 16, in which said suspension assembly is paired with a second said like suspension assembly on the opposite side of said disk from said first suspension assembly.

21. The disk drive suspension according to claim 16, in which said mounting plate is planar.

22. The disk drive suspension according to claim 16, in which said mounting plate is planar except for a boss defined by said mounting plate, said mounting plate boss being adapted to freely fit within said actuator through opening.

23. The disk drive suspension according to claim 22, in which said mounting plate defines a boss having a polygonal outer periphery.

24. The disk drive suspension according to claim 23, in which said actuator through opening has a polygonal inner periphery interfitting with said mounting plate boss outer periphery in contacting relation.

25. The disk drive suspension according to claim 16, in which said load beam defines a through opening registered with said mounting plate opening, said load beam being bonded to said mounting plate outwardly of said load beam through opening.

26. The disk drive suspension according to claim 25, in which said load beam is relieved circumferentially of said beam through opening to have a recess sized to bodily receive one or another of said connector terminal flanges.

* * * * *